United States Patent
Kumar et al.

(10) Patent No.: US 12,406,517 B2
(45) Date of Patent: Sep. 2, 2025

(54) SYSTEMS AND METHODS FOR PROVIDING A SELF-LEARNING ESTIMATION ADVISOR

(71) Applicant: ACCENTURE GLOBAL SOLUTIONS LIMITED, Dublin (IE)

(72) Inventors: Abhijit Kumar, Bangalore (IN); Arvind Maheswaran, Bangalore (IN); Amartya Ray, Thane (IN); Jenoy Easow, Bangalore (IN); Glanda Meera Nazareth, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 303 days.

(21) Appl. No.: 18/110,951

(22) Filed: Feb. 17, 2023

(65) Prior Publication Data
US 2024/0282135 A1 Aug. 22, 2024

(51) Int. Cl.
*G06V 30/416* (2022.01)
*G06V 30/19* (2022.01)

(52) U.S. Cl.
CPC ........ *G06V 30/416* (2022.01); *G06V 30/1916* (2022.01); *G06V 30/19193* (2022.01)

(58) Field of Classification Search
CPC .......................... G06V 30/416; G06V 30/1916
USPC ........................................................ 382/181
See application file for complete search history.

(56) References Cited

U.S. PATENT DOCUMENTS

| | | | |
|---|---|---|---|
| 989,309 A | 4/1911 | Steele | |
| 1,012,929 A | 12/1911 | Steele | |
| 1,147,981 A | 7/1915 | Smith | |
| 1,336,904 A | 4/1920 | Hopkins | |
| 1,413,648 A | 4/1922 | Yaw | |
| 1,423,808 A | 7/1922 | Mcclusky | |
| 5,893,076 A | 4/1999 | Hafner et al. | |
| 8,078,485 B1 | 12/2011 | Krachmueller et al. | |
| 8,321,356 B2 * | 11/2012 | Awaida | G06Q 30/0283 705/400 |
| 8,725,656 B1 * | 5/2014 | Gill | G06Q 10/101 705/331 |
| 8,802,624 B2 | 8/2014 | Nilsson et al. | |
| 9,619,463 B2 * | 4/2017 | Ghosal | G06F 40/51 |
| 10,860,115 B1 | 12/2020 | Tran | |
| 11,494,726 B2 * | 11/2022 | Marrale | G06Q 10/0834 |

(Continued)

OTHER PUBLICATIONS

"CzarLite", an SMC3 Whitepaper, Nov. 2019, 8 pages.

(Continued)

*Primary Examiner* — Quang N Vo
(74) *Attorney, Agent, or Firm* — Mannava & Kang, P.C.

(57) ABSTRACT

Systems and methods for estimating freight costs are disclosed herein. The system receives, from a user interacting with the system, a first document and a second document, where an actual value is associated with the second document. Further, the system determines a set of variables for each of the first document and the second document based on a statistical analysis of historical data. Furthermore, the system estimates, using a trained artificial neural network model, a cost associated with each of the first document and the second document based on the determined set of variables. The cost associated with the first document includes an estimated freight cost for the first document, and the cost associated with the second document includes an estimated true value for the second document.

18 Claims, 10 Drawing Sheets

(56) References Cited

U.S. PATENT DOCUMENTS

| | | |
|---|---|---|
| 2004/0243358 A1 | 12/2004 | Schliep et al. |
| 2005/0033668 A1 | 2/2005 | Garcia et al. |
| 2007/0150387 A1 | 6/2007 | Seubert et al. |
| 2008/0097933 A1* | 4/2008 | Awaida ............. G06Q 30/0283 705/400 |
| 2008/0120129 A1 | 5/2008 | Seubert et al. |
| 2014/0032427 A1 | 1/2014 | Gannon |
| 2015/0039500 A1 | 2/2015 | Byrne et al. |
| 2016/0063322 A1 | 3/2016 | Déjean et al. |
| 2018/0240066 A1* | 8/2018 | Streebin ............. G06Q 10/0832 |
| 2019/0286935 A1* | 9/2019 | Becker ................... G06F 18/28 |
| 2020/0051013 A1 | 2/2020 | McIntosh |
| 2020/0210949 A1 | 7/2020 | Mugar et al. |
| 2020/0364664 A1 | 11/2020 | Chen et al. |
| 2021/0087048 A1 | 3/2021 | Kadakia et al. |
| 2021/0089055 A1 | 3/2021 | Tran |
| 2022/0283580 A1 | 9/2022 | Chen et al. |
| 2023/0138491 A1* | 5/2023 | Semenov ................ G06N 3/08 382/176 |
| 2024/0185172 A1* | 6/2024 | Delchev ............. G06Q 30/0206 |

OTHER PUBLICATIONS

Shoaib Bakhtyar et al., "Freight transport prediction using electronic waybills and machine learning", 2014 ICCSS, pp. 128-133.
SMC3, "BatchMarkXL", 2 pages, downloaded on Nov. 29, 2022.
SMC3, "CarrierConnectXL", 5 pages, downloaded on Nov. 29, 2022.

* cited by examiner

| KB# 702 | KB Name 704 | Description 706 | Method used 708 |
|---|---|---|---|
| 1 | Training Set | Refreshed monthly or quarterly with latest data. This is a repository of all paid (& audited) invoices. All downstream & dependent databases & knowledgebases are refreshed with it | FIFO |
| 2 | Ideal Freight Cost per KG & Ideal Accessorial Charges Ratio | Knowledge base to convert POs & SOs to pseudo freight invoices | Complex Statistics |
| 3 | Internal Error in Freight Cost & Accessorial Cost | Database which helps to account for errors in KB#2 | Simple Statistics |
| 4 | Source Location to Source Port Distance | A database which contain the distance (in KMs) of each customer's location to the port (or air-port) which is included in it's assigned route | Distance derived via API from external source |
| 5 | Min – Max Database | Contains the min and max value of every numerical variable from the test set. This is used for absolute to normal form conversation vice versa | Simple Statistical Norms [vide Miscellaneous] |
| 6 | Shipment Classification | Clustering or classifying goods/products into "Dangerous", "Oversize" & "Normal" | Simple product knowledge-based clustering |
| 7 | Receiver Classification | Consignees or receivers can be grouped based on habit patterns. E.g., based on certain accessorial/extra charges (such as demurrage, drop/delivery charge), which are levied when receivers delay shipments or accessibility of delivery location, receivers can be classified into risk categories. This is useful, particularly, from the point of view of dimensionality reduction – i.e., consolidating thousands of receivers into a few categories | Statistical Analysis |
| 8 | Route Consolidation | Route codes (codes representing the lane, SLA, mode & carrier combinations) are classified into very high cost, high cost, average cost, low cost & very low cost. This is useful, particularly, from the point of view of dimensionality reduction – i.e., consolidating thousands of routes into a few categories | Statistical Clustering |
| 9 | Carrier Behavior | When multiple carriers are available per route code, such carriers can be classified into L1, L2, etc., based on a combination of their past performance & cost (per kg). Here, performance includes on-time delivery, goods damage, customs duty levied accuracy of document preparation, etc. | Data Collection & Pattern Analysis |
| 10 | Consigner Behavior | Behavior such as on time - in full payment, keeping up to volume commitments, etc., effect future freight cost | Data Collection & Pattern Analysis |
| 11 | Carrier Relationship with Customs | Some carriers perform better as Clearing House Agents (if that's a role assigned) at certain ports. CHA performance may have serious bearing on overall freight invoices depending on incoterm etc. | Data Collection & Pattern Analysis |

FIG. 7

| DATA SOURCE 802 | VARIABLE NAME 804 | DATA TYPE 806 |
|---|---|---|
| AWB | CARRIER NAME/CODE | CATEGORICAL |
| AWB | SERVICE-LEVEL USED | CATEGORICAL |
| AWB | YEAR OF SHIPMENT CONNECTION | CATEGORICAL |
| AWB | MONTH OF SHIPMENT CONNECTION | CATEGORICAL |
| AWB | MODE OF TRANSPORTATION | CATEGORICAL |
| NON-OBVIOUS | CLASSIFIED TYPE OF SHIPMENT | CATEGORICAL |
| NON-OBVIOUS | CLASSIFIED PORT TO PORT COST | CATEGORICAL |
| AWB | INCOTERM | CATEGORICAL |
| NON-OBVIOUS | RISK ASSOCIATED WITH THE SHIPPER | CATEGORICAL |
| NON-OBVIOUS | RISK ASSOCIATED WITH THE RECEIVER | CATEGORICAL |
| EXTERNAL | SOURCE LOCATION TO SOURCE PORT DISTANCE | NUMERIC |
| EXTERNAL | DESTINATION PORT TO DESTINATION LOCATION DISTANCE | NUMERIC |
| AWB | CHARGEABLE WEIGHT | NUMERIC |
| INVOICE/CONTRACT | FREIGHT CHARGE | NUMERIC |
| INVOICE/CONTRACT | ACCESSORIAL CHARGES | NUMERIC |
| NON-OBVIOUS | RISK ASSOCIATED WITH THE CARRIER | CATEGORICAL |

FIG. 8

SYSTEMS AND METHODS FOR PROVIDING A SELF-LEARNING ESTIMATION ADVISOR

BACKGROUND

In today's time, shipping goods is a huge business. Carriers have a finite amount of cargo space, and accordingly, shippers often negotiate with multiple carriers to coordinate the movement of just one container. Typically to limit the uncertainty and cost of moving goods, shippers contract with multiple carriers to provide a predetermined volume of business to each carrier at an agreed upon rate. This gives shippers the flexibility to choose from a number of different carriers to transport goods between different ports.

Further, CxOs are perpetually confronted with the task of accurate zero-based budgeting. Estimating cost of future invoices may be important, for this activity, yet difficult even for experienced domain experts.

With such a rapid increase in the shipping and transportation business, there is a growing need to estimate future transportation costs associated with purchase orders and sales orders. Further, auditing of the generated freight invoices is an increasing concern. For example, it remains a concern for organization and customers to determine incorrect freight cost, tariffs, applied in the generated freight invoices. There may be multiple invoices for the same shipment and there may be missing data or incomplete information in the generated freight invoices.

There is, therefore, a need for systems and methods for addressing at least the above-mentioned problems in existing systems.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system, i.e. a freight invoice estimation advisor. The system may include a processor, and a memory coupled to the processor, where the memory may include processor-executable instructions, which on execution, may cause the processor to receive, from a user interacting with the system, a first document and a second document, where an actual value may be associated with the second document. Further, the processor may determine a set of variables for each of the first document and the second document, where the set of variables may be determined based on a statistical analysis of historical data, and estimate, using a trained artificial neural network model, a cost associated with each of the first document and the second document based on the determined set of variables, where the cost associated with the first document may include an estimated freight cost for the first document, and the cost associated with the second document may include an estimated true value for the second document.

In an example embodiment, the processor may convert the first document into a pseudo document.

In an example embodiment, the processor may convert the first document into the pseudo document by estimating a set of parameters for the first document based on the set of variables, assigning the set of parameters to the first document based on a knowledge base, and converting the first document into the pseudo document based on the assigned set of parameters.

In an example embodiment, the set of parameters may include at least one of an accessorial cost and a freight cost.

In an example embodiment, the processor may validate the estimated true value for the second document with the actual value associated with the second document. In response to a positive validation, the processor may dynamically enrich a knowledge base based on the second document, and in response to a negative validation, the processor may flag the second document for audit.

In an example embodiment, the set of variables may include a first set of variables and a second set of variables, where the first set of variables and the second set of variables may be further segregated into one of categorical variables and numerical variables.

In an example embodiment, the processor may determine the set of variables by extracting the second set of variables based on the statistical analysis of the historical data, where the historical data may include at least data from audited second documents.

In an example embodiment, the second set of variables may include at least one of classified type of shipment, classified port-to-port cost, risk associated with a shipper, risk associated with a receiver, and a risk associated with a carrier.

In an example embodiment, the first set of variables may include at least one of a unique key of the first document, a source port, a destination port, a selected carrier, a customer name, and a chargeable weight.

In an example embodiment, the processor may determine the set of variables by processing the set of variables based on applying an encoding technique on the categorical variables and normalizing the numeric variables, enriching the processed set of variables based on the knowledge database, and training the artificial neural network model based on the enriched set of variables.

In an example embodiment, the knowledge base may include at least one of an ideal accessorial cost and an ideal freight cost corresponding to each of the set of variables.

In an aspect, the present disclosure relates to a method for estimating freight costs. The method may include receiving, by a processor in a system, from a user interacting with the system, a first document and a second document, where an actual value may be associated with the second document, determining, by the processor, a set of variables for each of the first document and the second document, where the determining may be based on a statistical analysis of historical data, and estimating, by the processor, using a trained artificial neural network model, a cost associated with each of the first document and the second document based on the determined set of variables, where the cost associated with the first document may include an estimated freight cost for the first document, and where the cost associated with the second document may include an estimated true value for the second document.

In another aspect, the present disclosure relates to a non-transitory computer-readable medium comprising machine-readable instructions that are executable by a processor to perform the steps of the method described herein.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 7 illustrates an example representation of an inventory of knowledge base(s), in accordance with embodiments of the present disclosure.

FIG. 8 illustrates an example representation of a list of variables used by a proposed system, in accordance with embodiments of the present disclosure.

Figure 1:
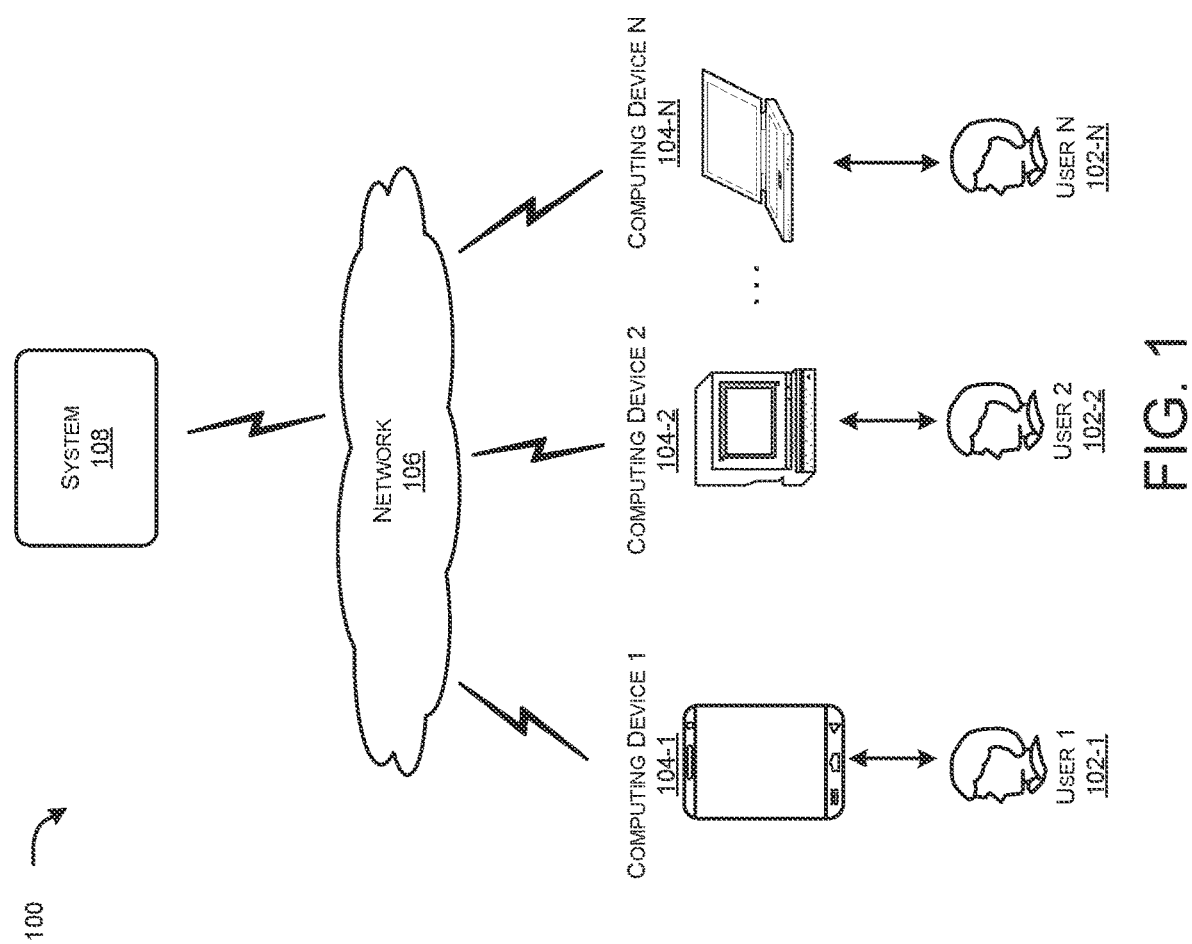
FIG. 1 illustrates an operating environment of a network architecture for implementing a system, in accordance with embodiments of the present disclosure.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present disclosure provides a freight invoice cost estimation advisor built upon artificial intelligence and/or machine language predictions. In particular, the freight invoice estimation advisor is an artificially intelligent advisory tool, which provides subject matter expert, or judgment based estimates of true values of already raised freight invoices. Additionally, if purchase orders and/or sales orders, converted into pseudo invoices, are provided as an input, the freight invoice estimation advisor provides subject matter expert or judgment-based estimates of future transportation cost associated with the respective purchase orders or sales orders.

In particular, the present disclosure describes a system, i.e. a freight invoice estimation advisor, for dynamically estimating costs associated with one or more documents such as, but not limited to, already raised freight invoices, purchase orders, sales orders, and the like. As an initial step, the system may receive, from a user interacting with the system, a first document and a second document. In an example embodiment, an actual value may be associated with the second document. Further, the system may determine a set of variables for each of the first document and the second document. In an example embodiment, the set of variables may be determined based on a statistical analysis of historical data. In an example embodiment, the set of variables may include a first set of variables and a second set of variables, where the first set of variables and the second set of variables may be further segregated into one of categorical variables and numerical variables. In an example embodiment, the first set of variables may include at least one of a unique key of the first document, a source port, a destination port, a selected carrier, a customer name, and a chargeable weight. In an example embodiment, the second set of variables may include at least one of classified type of shipment, classified port-to-port cost, risk associated with a shipper, risk associated with a receiver, and a risk associated with a carrier.

In an example embodiment, the system may determine the set of variables by extracting the second set of variables based on the statistical analysis of the historical data, where the historical data may include at least data from audited second documents.

In an example embodiment, the system may determine the set of variables by processing the set of variables based on applying an encoding technique on the categorical variables and normalizing the numeric variables, enriching the processed set of variables based on the knowledge database, and training the artificial neural network model based on the enriched set of variables.

Further, the system may estimate, using a trained artificial neural network model, a cost associated with each of the first document and the second document based on the determined set of variables. In an example embodiment, the cost associated with the first document may include an estimated freight cost for the first document. In an example embodiment, the cost associated with the second document may include an estimated true value for the second document. In the event that the input document is the second document, i.e. document containing pseudo invoices, the estimated cost may be aggregated at monthly, quarterly, half yearly, or annual basis to provide the aggregate estimated cost of future invoices.

In an example embodiment, the system may validate the estimated true value for the second document with the actual value associated with the second document. In response to a positive validation, the system may dynamically enrich a knowledge base based on the second document, and in response to a negative validation, the system may flag the second document for audit.

In an example embodiment, the system may convert the first document into a pseudo document. In an example embodiment, the system may convert the first document into the pseudo document by estimating a set of parameters for the first document based on the set of variables. Further, the system may assign the set of parameters to the first document based on a knowledge base, and convert the first document into the pseudo document based on the assigned set of parameters. In an example embodiment, the set of parameters may include at least one of an accessorial cost and a freight cost.

In an example embodiment, the knowledge base may include at least one of an ideal accessorial cost and an ideal freight cost corresponding to each of the set of variables.

Therefore, the present disclosure discloses a freight invoice estimation advisor or system to predict and estimate freight costs based on an artificial neural network.

The various embodiments throughout the disclosure will be explained in more detail with reference to FIGS. 1-10.

FIG. 1 illustrates an example operating environment or a network architecture 100 in which a system 108 such as a freight invoice estimation advisor may be implemented for estimating costs associated with a set of documents, in accordance with embodiments of the present disclosure.

In this embodiment, the network architecture 100 may include one or more computing devices (104-1, 104-2 . . . 104-N) operated by one or more users (102-1, 102-2 . . . 102-N). A person of ordinary skill in the art will appreciate that the one or more computing devices (104-1, 104-2 . . . 104-N) may be collectively referred as computing devices 104 and individually referred as computing device 104. A person of ordinary skill in the art will understand that there can be any number of computing devices 104 in the network architecture 100. Similarly, a person of ordinary skill in the art will understand that the one or more users (102-1, 102-2 . . . 102-N) may be collectively referred as users 102 and individually referred as user 102.

In an example embodiment, the computing device 104 may refer to a wireless device and/or a user equipment (UE). It should be understood that the terms "computing device," "wireless device," and "user equipment (UE)" may be used interchangeably throughout the disclosure.

A wireless device or the UE may include, but not be limited to, a handheld wireless communication device (e.g., a mobile phone, a smart phone, a phablet device, and so on), a wearable computer device (e.g., a head-mounted display computer device, a head-mounted camera device, a wristwatch computer device, and so on), a Global Positioning System (GPS) device, a laptop computer, a tablet computer, or another type of portable computer, a media playing device, a portable gaming system, and/or any other type of computer device with wireless communication capabilities, and the like. In an example embodiment, the computing devices 104 may communicate with the system 108 via a set of executable instructions residing on any operating system. In an example embodiment, the computing devices 104 may include, but are not limited to, any electrical, electronic, electro-mechanical or an equipment or a combination of one or more of the above devices such as virtual reality (VR) devices, augmented reality (AR) devices, laptop, a general-purpose computer, desktop, personal digital assistant, tablet computer, mainframe computer, or any other computing device, wherein the computing device 104 may include one or more in-built or externally coupled accessories including, but not limited to, a visual aid device such as camera, audio aid, a microphone, a keyboard, input devices for receiving input from the user 102 such as touch pad, touch enabled screen, electronic pen and the like.

A person of ordinary skill in the art will appreciate that the computing devices 104 may not be restricted to the mentioned devices and various other devices may be used.

Referring to FIG. 1, the system 108 may be communicatively coupled to the computing devices 104 via a network 106. In an example embodiment, the system 108 may communicate with the computing devices 104 in a secure manner via the network 106. The network 106 may include, by way of example, but not limited to, at least a portion of one or more networks having one or more nodes that transmit, receive, forward, generate, buffer, store, route, switch, process, or a combination thereof, etc. one or more messages, packets, signals, some combination thereof, or so forth. The network 106 may also include, by way of example, but not limited to, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fibre optic network, or some combination thereof. In particular, the network 106 may be any network over which the user 102 communicates with the system 108 using their respective computing devices (e.g., computing devices 104).

Referring to FIG. 1, the system 108 may be implemented by way of a single device or a combination of multiple devices that may be operatively connected or networked together. The system 108 may be implemented in a hardware or a suitable combination of hardware and software. In another example embodiment, the system 108 may be implemented as a cloud computing device or any other device that is network connected. In an example embodiment, the system 108 may implement artificial intelligence (AI) and machine learning (ML) prediction algorithm to estimate true value of already raised freight invoices and to predict future transportation cost for the purchase orders or sales orders.

In accordance with embodiments of the present disclosure, the user 102 may upload a set of documents on the system 108 via the computing device 104, for example, already raised freight invoices to estimate true value associated with the freight invoices. Based on the estimated true value of the freight invoices, the system 108 may flag the freight invoices in case of any discrepancy. In another example embodiment, the user 102 may upload purchase orders or sales orders on the system 108 via the computing device 104 to estimate future freight cost associated with the purchase orders or the sales orders.

Although FIG. 1 shows exemplary components of the network architecture 100, in other embodiments, the network architecture 100 may include fewer components, different components, differently arranged components, or additional functional components than depicted in FIG. 1. Additionally, or alternatively, one or more components of the network architecture 100 may perform functions described as being performed by one or more other components of the network architecture 100.

Figure 2:
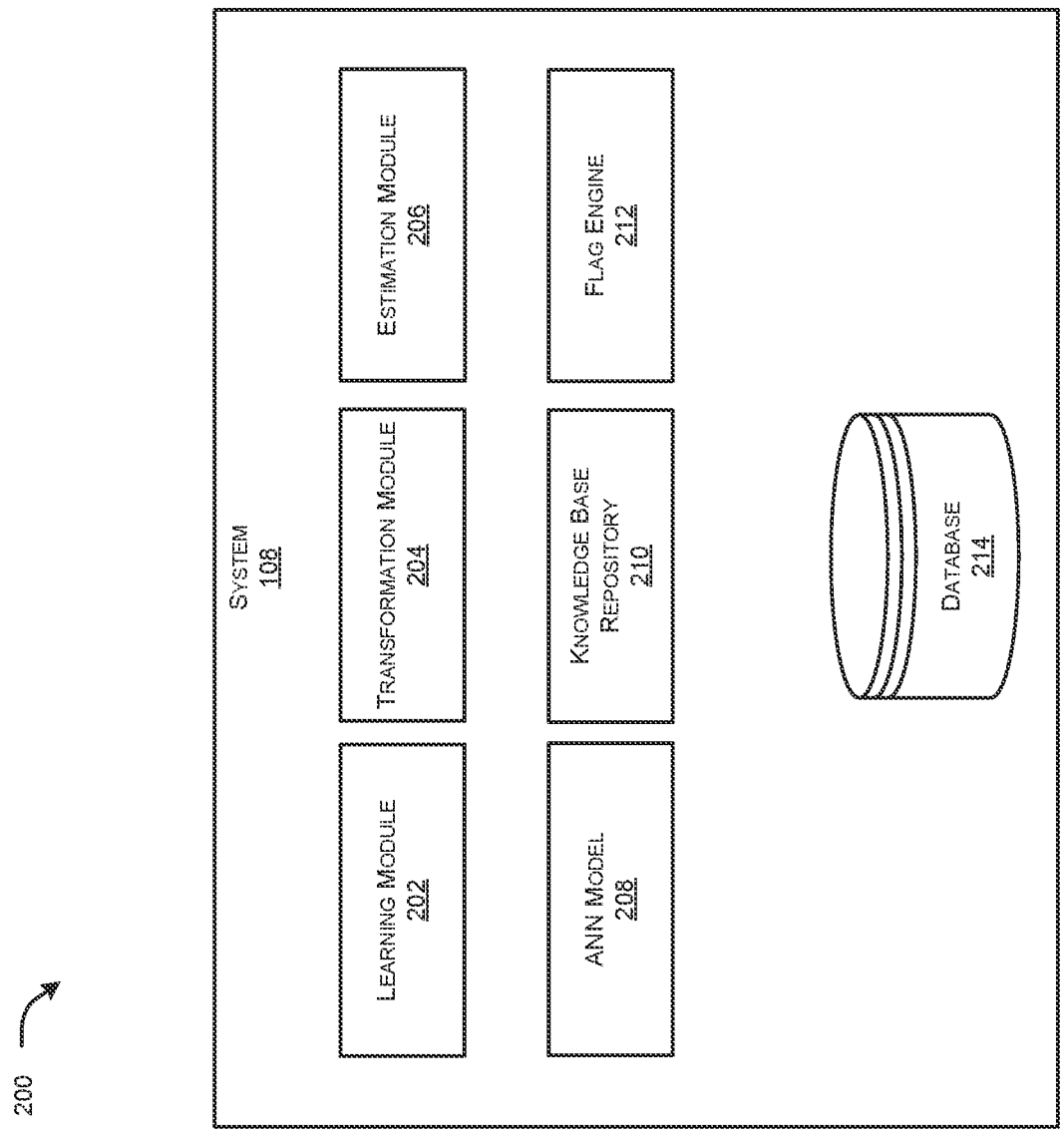
FIG. 2 illustrates an example block diagram of a proposed system, in accordance with embodiments of the present disclosure.

FIG. 2 illustrates an example block diagram 200 of a proposed system 108 such as a freight invoice estimation advisor, in accordance with embodiments of the present disclosure. It may be appreciated that the system 108 of FIG. 2 may be similar to the system 108 of FIG. 1 in its functionality.

Referring to FIG. 2, the system 108 may include a learning module 202, a transformation module 204, an estimation module 206, an artificial neural network (ANN) model 208, a knowledge base repository 210, a flag engine 212, and a database 214.

Learning Module 202

Referring to FIG. 2, the learning module 202 may refer to an engine that facilitates the ANN model 208 to learn from historical data. In an example embodiment, the learning module 202 may process information and/or events related to freight management and transportation. In an example embodiment, the learning module 202 may identify a set of learning enablers from the processed information and/or events including, but not limited to, historical transactional data from audited freight invoices, non-obvious variables from statistical analysis of historical data, and external data by connecting to appropriate resources (or data sources) via application programming interface (API). The historical data, which includes one or more time-series data sets, may be retrieved from a plurality of resources. Time series data which may be also referred to as time-stamped data, may be a sequence of data points collected at different points in time and indexed in time order. These data points may represent successive measurements made from the same resource over a time interval and may be used to track changes over time. Each time series data set may be transformed into a set of variables. Different resources may include different types of data and therefore different methodologies may be implemented to convert the different types of data into the set of variables. The set of variables thus generated from the historical data may be stored and used as training data for the ANN model 208.

In an example embodiment, the non-obvious variables may refer to a set of variables that may not be directly extracted from freight invoices, purchase orders, or sales orders. For example, the non-obvious variables may include, but not be limited to, classified type of shipment, classified port to port cost, risk associated with a shipper, risk associated with a receiver, risk associated with a carrier, or the like. Further, obvious variables may refer to a set of variables that may be directly extracted from the freight invoices, purchase orders, or sales orders. For example, the obvious variables may include, but not be limited to, carrier name, service level used, year of shipment connection, month of shipment connection, mode of transportation, chargeable weight, freight charge, accessorial charge, or the like. In an example embodiment, the learning module 202 may use the external data by connecting to suitable and appropriate resources via API. The external data may include, but not be limited to, distance from source location to source port, distance from destination port to destination location, or the like.

In an example embodiment, the learning module 202 may enrich the identified learning enablers. The learning module 202 may perform pre-enrichment on the identified learning enablers. In such an embodiment, the learning module 202 may perform data cleanup and noise removal on the learning enablers. The learning module 202 may also categorize the obvious variables and the non-obvious variables into numerical variables and categorical variables. A person or ordinary skill in the art will understand that the categorical variables may refer to data that may be divided into groups. For example, the categorical variables may include, but not be limited to, carrier name, service level used, year of shipment connection, month of shipment connection, mode of transportation, classified type of shipment, classified port to port cost, risk associated with a shipper, risk associated with a receiver, risk associated with a carrier, or the like. Further, a person of ordinary skill in the art will understand that the numerical variables may refer to data that is in the form of numbers, and not in a descriptive form. For example, the numerical variables may include, but not be limited to, chargeable weight, freight charge, accessorial charge, and distance from source location to source port, and distance from destination port to destination location, or the like. In an example embodiment, the learning module 202 may enrich the learning enablers by encoding the categorical variables. In another example embodiment, the learning module 202 may enrich the learning enablers by normalizing the numerical variables. Additionally or alternatively, the steps of data enrichment may be performed by the transformation module 204. In such a scenario, the learning module 202 may provide the pre-enriched data, i.e., learning enablers to the transformation module 204 for further enrichment.

Therefore, the learning module 202 may facilitate training the ANN model 208. In an example embodiment, the learning module 202 may store the data in the knowledge base repository 210.

Transformation Module 204

Referring to FIG. 2, the transformation module 204 may refer to an engine that transforms and enriches data received from the learning module 202, the estimation module 206, and/or the knowledge base repository 210. In an example embodiment, the transformation module 204 may encode the categorical variables and normalize the numerical variables. In an example embodiment, the transformation module 204 may apply one hot encoding on the categorical variables to convert the categorical variables into binary code. A person of ordinary skill in the art will understand that one hot encoding may refer to a technique of converting the categorical variables into integer format to use the encoded data for prediction and estimation. In an example embodiment, the transformation module 204 may normalize the numerical variables using min-max method. A person of ordinary skill in the art will understand that min-max normalization may refer to a technique that performs linear transformation on the numerical variables. In an example embodiment, the transformation module 204 may store the min-max values associated with each numerical variable in the database 214.

In an example embodiment, the transformation module 204 may further enrich the data based on data stored in the knowledge base repository 210. The transformation module 204 may perform data cleanup and noise removal. In an example embodiment, the transformation module 204 may facilitate training of the ANN model 208. In another embodiment, the transformation module 204 may provide the data to the estimation module 206 for assessment, i.e. prediction and estimation.

Estimation Module 206

Referring to FIG. 2, the estimation module 206 may refer to an engine that performs prediction and estimation of costs associated with a set of documents including, but not limited to, freight invoices, purchase orders, and sales orders. In an example embodiment, the estimation module 206 may receive a first document and a second document from a computing device (for example, the computing device 104 of FIG. 1). The first document may refer to purchase orders and sales orders. The second document may refer to already raised freight invoices. It may be appreciated that the terms "first document(s)," "purchase order(s)," and "sales order(s)" may be used interchangeably throughout the disclosure. Further, the terms "second document(s)" and "already raised freight invoices" may be used interchangeably throughout the disclosure.

In an example embodiment, the estimation module 206 may convert the first document into a pseudo document. The pseudo document may be a template for a freight invoice. The estimation module 206 may determine a set of variables associated with the first document. In an example embodiment, the set of variables may include obvious variables and non-obvious variables. The obvious variables and the non-obvious variables may be further segregated into categorical variables and numerical variables. In an example embodiment, the estimation module 206 may determine the set of variables based on statistical analysis of historical data, i.e. based on inputs from the learning module 202 and the knowledge base repository 210. In an example embodiment, the estimation module 206 may determine a set of parameters for the first document based on the determined set of variables. Further, the estimation module 206 may assign the set of parameters to the first document based on data stored at the knowledge base repository 210. Furthermore, the estimation module 206 may convert the first document into the pseudo document based on the assigned set of parameters. For example, the set of parameters may include, but not be limited to, freight cost associated with the set of variables determined from the first document, accessorial cost associated with the set of variables determined from the first document, or the like. It may be understood that an ideal freight cost and an ideal accessorial cost may be stored at the knowledge base repository 210 for each set of variables based on a learning phase of the system 108.

In an example embodiment, the estimation module 206 may identify the set of variables for the second document. The estimation module 206 may identify the set of variables for the second document in a similar manner as that for the first document, i.e. based on a statistical analysis of the historical data. In an example embodiment, the set of variables for the first document (i.e. purchase orders and sales orders) may include, but not be limited to, route, carrier, customer, mode of transportation, or the like. In another example embodiment, the set of variables for the second document (i.e. already raised freight invoices) may include, but not be limited to, route, carrier, customer, mode of transportation, and additional variables. Based on the set of variables, the estimation module 206 may flag misfits for each of the first document and the second document. For example, the estimation module 206 may validate the determined set of variables for each of the first document and the second document with the data stored at the knowledge base repository 210. That is, the estimation module 206 may cross-check if the variables patterns in the estimation data matches with training set data using by the learning module 202 in the knowledge base repository 210.

Example Data for Flagging Misfits

As an example, but not limited to, the estimation module 206 may use the below table to flag misfits.

| Sr# | Variable - Test Set | Variable - Training Set | Check |
| --- | --- | --- | --- |
| 1 | Carrier | Carrier | Check if the carrier of each item of the test set is present in the training set |
| 2 | Pickup month | Pickup month | Check if the pickup month of each item of the test set is present in the training set |
| 3 | Port to Port | Port to Port | Check if the port to port of each item of the test set is present in the training set |

-continued

| Sr# | Variable - Test Set | Variable - Training Set | Check |
|---|---|---|---|
| 4 | Chargeable Weight | Chargeable Weight | The Chargeable weight of each item of the test set must be within the max-min bounds of that of the training set |
| 5 | Freight Charge | Freight Charge | Applicable when the test set is unpaid invoices: The Chargeable weight of each item of the test set must be within the max-min bounds of that of the training set |
| 6 | Consigner city | Consigner city | Check if the Consigner city of each item of the test set is present in the training set |
| 7 | Incoterm | Incoterm | Check if the incoterm of each item of the test set is present in the training set |
| 8 | Accessorial Charges | Accessorial Charges | Applicable when the test set is unpaid invoices: Each Accessorial charge of each item of the test set must be within the max-min bounds of that of the training set |
| 9 | | Disruptive Period | Check if majority of the data contained in one of two sets, the test or training, are from a period of disruption & the other from normal period (that of non-disruption) |

Further, in an example embodiment, the estimation module 206 may perform pre-enrichment of the determined set of variables, i.e. noise removal, or the like. Further, the estimation module 206 may provide the pre-enriched data to the transformation module 204 for further transformation and enrichment, as explained above with reference to the transformation module 204. Once the enriched data is received from the transformation module 204, the estimation module 206 may estimate a cost associated with each of the first document and the second document. The estimation module 206 may utilize the trained ANN model 208 to estimate the cost. That is, the estimation module 206 may request the ANN model 208 to estimate the cost. In an example embodiment, the estimation module 206 may estimate, using the ANN model 208, a future freight cost for the first document, i.e. purchase orders and sales orders. In another example embodiment, the estimation module 206 may estimate, using the ANN model 208, a true value for the second document, i.e. already raised freight invoices.

Artificial Neural Network (ANN) Model 208

Referring to FIG. 2, the ANN model 208 may refer to a deep learning method including algorithms that are based on brain function used to model complicated patterns and predict issues. For example, the ANN model 208 may be a non-linear statistical model, which displays a complex relationship between inputs and outputs to discover a new pattern.

In accordance with embodiments of the present disclosure, the ANN model 208 may be trained to generate a cost estimation for a set of documents, i.e. first document (purchase orders and sales orders) and second document (already raised freight invoices). In an example embodiment, the ANN model 208 may estimate a future freight cost for the purchase orders and sales orders. In an example embodiment, the estimated freight cost for the purchase orders and sales orders may be aggregated at monthly, quarterly, half yearly, or annual basis to provide an aggregate estimated cost of future invoices. Additionally, the ANN model 208 may estimate a true value for the already raised freight invoices. In an example embodiment, the ANN model 208 may provide the estimated true value for the already raised freight invoices to the flag engine 212.

Knowledge Base Repository 210

Referring to FIG. 2, the knowledge base repository 210 may refer to a store of databases including data received from the learning module 202. In an example embodiment, the knowledge base repository 210 may include, but not be limited to, one or more knowledge bases, variables associated with each knowledge base, and method used for analyzing the data in each knowledge base. For example, the one or more knowledge bases may include, but not be limited to, shipment classification, receiver classification, route classification, carrier behavior, consigner behavior, carrier effect of customs, accessorial charges, source location to source port, destination port to destination location, or the like. Further, the method(s) used to categorize the variables may include, but not be limited to, pattern analysis, clustering, or the like.

In an example embodiment, the transformation module 204 may enrich the data using inputs from the knowledge base repository 210. In an example embodiment, the estimation module 206 may generate the pseudo document for the first document based on inputs from the knowledge base repository 210. In an example embodiment, the knowledge base repository 210 may be dynamically enriched based on the estimation of costs associated with each of the first document and the second document.

Flag Engine 212

Referring to FIG. 2, the flag engine 212 may refer to an engine for flagging a set of documents for audit. In an example embodiment, the flag engine 212 may receive the estimated true value for the second document from the ANN model 208. Based on the received data, the flag engine 212 may validate the estimated true value with an actual value associated with the second document. For example, the flag engine 212 may compare the estimate true value of the freight invoices with the actual cost mentioned in the freight invoice. Further, the flag engine 212 may dynamically enrich the knowledge base repository 210 based on a positive validation. That is, if the estimated true value matches with the actual value of the second document, the flag engine 212 may dynamically enrich the knowledge base repository 210 with data from the second document. Alternatively, the flag engine 212 may flag the second document for audit based on a negative validation. That is, if the estimated true value is different from the actual value of the second document, the flag engine 212 may flag the second document for audit.

Database 214

Referring to FIG. 2, the database 214 may include one or more data stores for storing information including, but not limited to, variables, normalized values of each variable, flagged documents, transactional data, or the like. In accordance with embodiments of the present disclosure, the database 214 may be dynamically updated for each document processed by the system 108.

In an example embodiment, the database 214 may integrate with the knowledge base repository 210 along with other components of the system 108 in order to remain updated with the latest information.

Although FIG. 2 shows exemplary components of the system 108, in other embodiments, the system 108 may include fewer components, different components, differently arranged components, or additional functional components than depicted in FIG. 2. Additionally, or alternatively, one or more components of the system 108 may perform functions described as being performed by one or more other components of the system 108.

Figure 3:
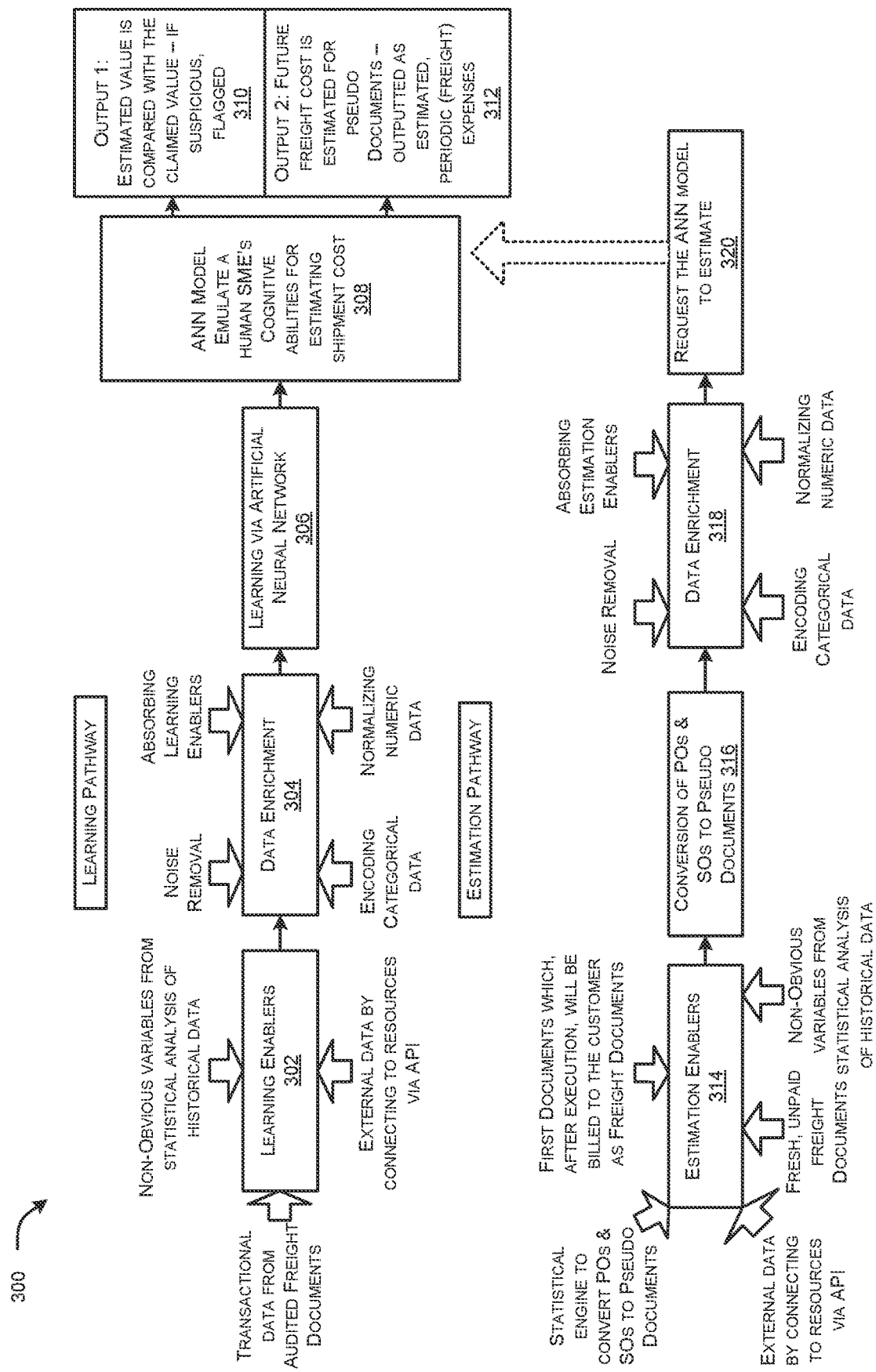
FIG. 3 illustrates an example flow diagram for implementing a learning phase and an estimation phase of a proposed system through an artificial neural network model, in accordance with embodiments of the present disclosure.

FIG. 3 illustrates an example flow diagram 300 for implementing a learning phase and an estimation phase for the proposed system through an artificial neural network model such as the ANN model 208 of FIG. 2, in accordance with embodiments of the present disclosure. It may be appreciated that FIG. 3 will be explained in conjunction with FIG. 2.

Referring to FIG. 3, at step 302, the proposed freight invoice estimation advisor such as the system 108 of FIGS. 1 and 2 may identify a set of learning enablers based on historical transaction data from audited freight invoices. Additionally, the system 108 may consider the non-obvious variables based on a statistical analysis of the historical transactional data and external data from a plurality of resources (or data sources) via API. In an example embodiment, the learning enablers may correspond to a set of variables including obvious variables and non-obvious variables. For example, the system 108 may process and analyze the historical transactional data to identify the set of variables.

At step 304, the system 108 may perform data enrichment. In an example embodiment, the system 108 may perform pre-enrichment corresponding to data cleanup and noise removal. In another example embodiment, the system may perform transformation and enrichment. The system 108 may segregate the determined set of variables (i.e. obvious and non-obvious variables) into categorical variables and numerical variables. In an example embodiment, the system 108 may convert the categorical variables into binary codes using an encoding technique. In an example embodiment, the encoding technique may include, but not be limited to, one hot encoding. In another example embodiment, the system 108 may normalize the numerical variables using a normalization technique. In an example embodiment, the normalization technique may include, but not be limited to, min-max normalization. Further, the system 108 may perform post-enrichment including data cleanup and noise removal.

At step 306, the system 108 may facilitate learning via ANN. In an example embodiment, the system 108 may facilitate learning of an ANN model (for example, the ANN model 208 of FIG. 2). It may be appreciated that the steps 302, 304, and 306 may correspond to a learning pathway of the system 108.

Referring to FIG. 3, at step 314, the system 108 may identify a set of estimation enablers. In an example embodiment, the system 108 may receive a set of documents in a request from a user associated with a computing device (for example, the user 102 associated with the computing device 104 of FIG. 1). In an example embodiment, the request may include a first document corresponding to a purchase order or a sales order. In another example embodiment, the request may include a second document corresponding to an already paid freight invoice. The system 108 may identify the set of estimation enablers, i.e. set of variables associated with each of the first document and the second document. In an example embodiment, the system 108 may identify the set of variables based on a statistical analysis of the historical transactional data (from the learning pathway, i.e. steps 302, 304, and 306). The set of variables may include both the obvious variables and the non-obvious variables.

At step 316, the system 108 may convert the first document (i.e. purchase order or sales order) into a pseudo document (or pseud freight invoice) based on the set of variables. The pseudo document may refer to a template for a freight invoice that will be billed to a user corresponding to the purchase order or sales order. In an example embodiment, the system 108 may determine a set of parameters from the set of estimation enablers. The system 108 may assign the set of parameters to the first document based on a knowledge base repository (for example, the knowledge base repository 210 of FIG. 2). Further, the system 108 may convert the first document into the pseudo document based on the assigned set of parameters.

At step 318, the system 108 may perform data enrichment, i.e. pre-enrichment, transformation, and post-enrichment. It may be appreciated that the step 318 may be similar to the step 306, the only difference being in the input of variables. That is, step 318 may involve the set of estimation enablers, while step 306 may involve the set of learning enablers.

Further, at step 320, the system 108 may request the ANN model 208 to estimate a cost associated with each of the first document and the second document. Referring to FIG. 3, at step 308, the system 108 may facilitate the ANN model 208 to perform at least dual functions, i.e. estimate future freight cost associated with the purchase order or the sales order, and estimate true value of the already paid freight invoice.

At step 310, the system 108 or the ANN model 208 may estimate the true value for the second document. In an example embodiment, the system 108 may validate the estimated true value for the document with an actual value mentioned in the second document. In case the values differ, the system 108 may flag the second document for audit. In case the values match, the system 108 may use the second document to enhance the ANN model 208. It may be appreciated that audit herein may refer to manual audit, but is not limited to the like.

At step 312, the system 108 or the ANN model 208 may estimate the freight cost for the first document. In an example embodiment, the system 108 may estimate the freight cost, associated with the pseudo document, as future expense for the user. It may be appreciated that the steps 308, 310, 312, 314, 316, 318, and 320 may correspond to an estimation pathway of the system 108.

It will be appreciated that the steps shown in FIG. 3 are merely illustrative. Other suitable steps may be used to implement the system, if desired. Moreover, the steps of the flow diagram 300 may be performed in any order and may include additional steps.

Figure 4:
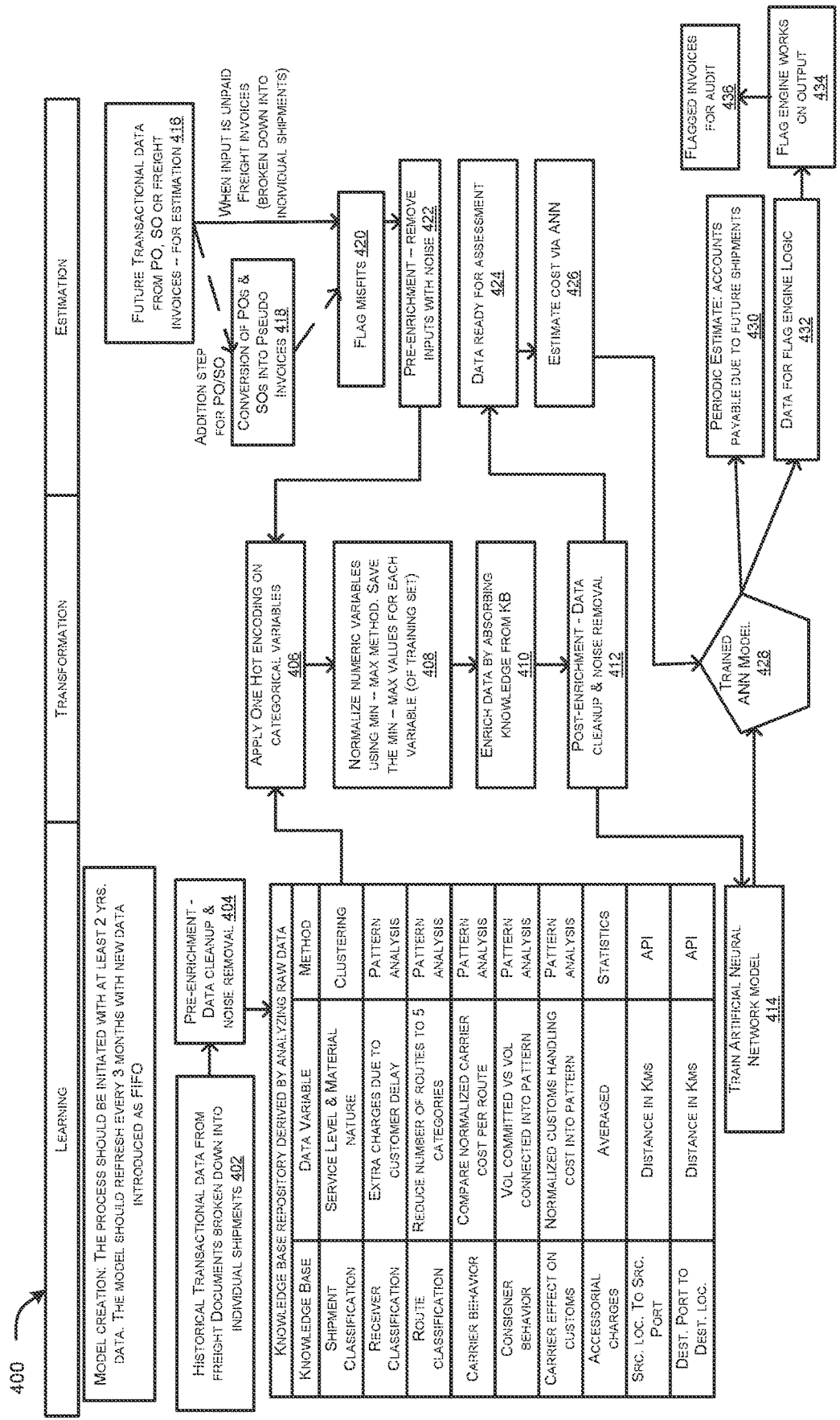
FIG. 4 illustrates an example flow diagram for implementing a learning phase, a transformation phase, and an estimation phase, in accordance with embodiments of the present disclosure.

FIG. 4 illustrates an example flow diagram 400 for implementing a learning phase, a transformation phase, and an estimation phase, in accordance with embodiments of the present disclosure. It may be appreciated that FIG. 4 will be explained in conjunction with FIGS. 2 and 3.

The steps of the flow diagram 400 may be performed by the system 108 (i.e. freight invoice estimation advisor). At step 402, the system 108 may process and analyze historical transaction data from audited freight documents. As an example, but not limited to, the system 108 may process the historical transaction data of at least a minimum period of time, for example, 2 years. In an example embodiment, the system 108 may facilitate the learning and training of the ANN model in every predetermined time period based on new data gathered. As an example, but not limited to, the system 108 may refresh the ANN model dynamically with each document processed by the system 108. In another example, the system 18 may refresh the ANN model every 3 months with new data entered in a First In First Out manner. In an example embodiment, the system 108 may split the audited freight documents into individual shipments. In an example embodiment, the system 108 may identify a set of learning enablers from the historical transactional data. It may be appreciated that the step 402 may correspond to the step 302 of FIG. 3, and hence, may not be described in detail again for the sake of brevity.

At step 404, the system 108 may perform pre-enrichment, i.e. data clean-up and noise removal. Based on analysing the historical transactional data, the system 108 may learn from the audited freight documents and train an ANN model for prediction and estimation. In an example embodiment, the system 108 may create a knowledge base repository such as the knowledge base repository 210 of FIG. 2, as also depicted in FIG. 4. As shown in FIG. 4, the knowledge base repository may include, but not be limited to, one or more knowledge bases, variables associated with each knowledge base, and a method used for categorizing the variables.

Referring to FIG. 4, at step 406, the system may perform transformation and enrichment on the data stored in the knowledge base repository. In an example embodiment, the system 108 may apply an encoding technique (for example, one hot coding) on the categorical variables in the knowledge base repository. In another example embodiment, at step 408, the system 108 may normalize the numerical variables in the knowledge base repository based on applying a normalization technique (for example, min-max normalization).

At step 410, the system 108 may enrich the data by absorbing the data from the knowledge base repository. Further, at step 412, the system 108 may perform post-enrichment, i.e. data clean-up and noise removal. Based on this data, the system 108 may train an ANN model (step 414).

Referring to FIG. 4, at step 416, the system 108 may receive a request from a user (such as the user 102 of FIG. 1). In an example embodiment, the request may include a set of documents for estimation. The set of documents may include a first document and a second document. The system 108 may identify a set of estimation enablers, i.e. set of variables associated with each of the first document and the second document. It may be appreciated that the step 416 may correspond to the step 314 of FIG. 3, and hence, may not be described in detail again for the sake of brevity.

At step 418, the system 108 may convert the first document into a pseudo document based on the determined set of estimation enablers (variables). Further, at step 420, the system 108 may determine if the determined set of variables for each of the first document and the second document correspond to the data stored at the knowledge base repository. That is, the system 108 may cross-check if the pattern in the determined variables matches with the training data at the knowledge base repository. In case there is a mismatch, the document (i.e. first document or second document) may be flagged for audit. In case there is no mismatch, the system 108 may perform pre-enrichment, i.e. data cleanup and noise removal at step 422.

Referring to FIG. 4, the system 108 may repeat the steps 406, 408, 410, and 412 for the set of variables determined for each of the first document and the second document. Once the transformation and enrichment is done, the system 108 may identify that the data is ready for assessment, i.e. prediction and estimation, at step 424. At step 426, the system 108 may estimate a cost associated with each of the first document (or pseudo document) and the second document via ANN. At step 428, the system 108 may facilitate the trained ANN model to estimate the cost.

Therefore, at step 430, the ANN model may provide the estimated future freight cost for the pseudo document (or the first document). At step 432, the ANN model may provide the estimated true value for the second document to a flag engine (for example, the flag engine 212 of FIG. 2).

Referring to FIG. 4, at step 434, the flag engine 212 may work on the output received from the ANN model. In an example embodiment, the flag engine 212 may validate the estimated true value for the second document with an actual value of the already paid freight invoice. In case of a positive validation, the flag engine 212 may facilitate the knowledge base repository to enhance the training data using the second document. In case of a negative validation, the flag engine 212 may flag the second document for audit, at step 436.

It will be appreciated that the steps shown in FIG. 4 are merely illustrative. Other suitable steps may be used to implement the system, if desired. Moreover, the steps of the flow diagram 400 may be performed in any order and may include additional steps.

Figure 5:
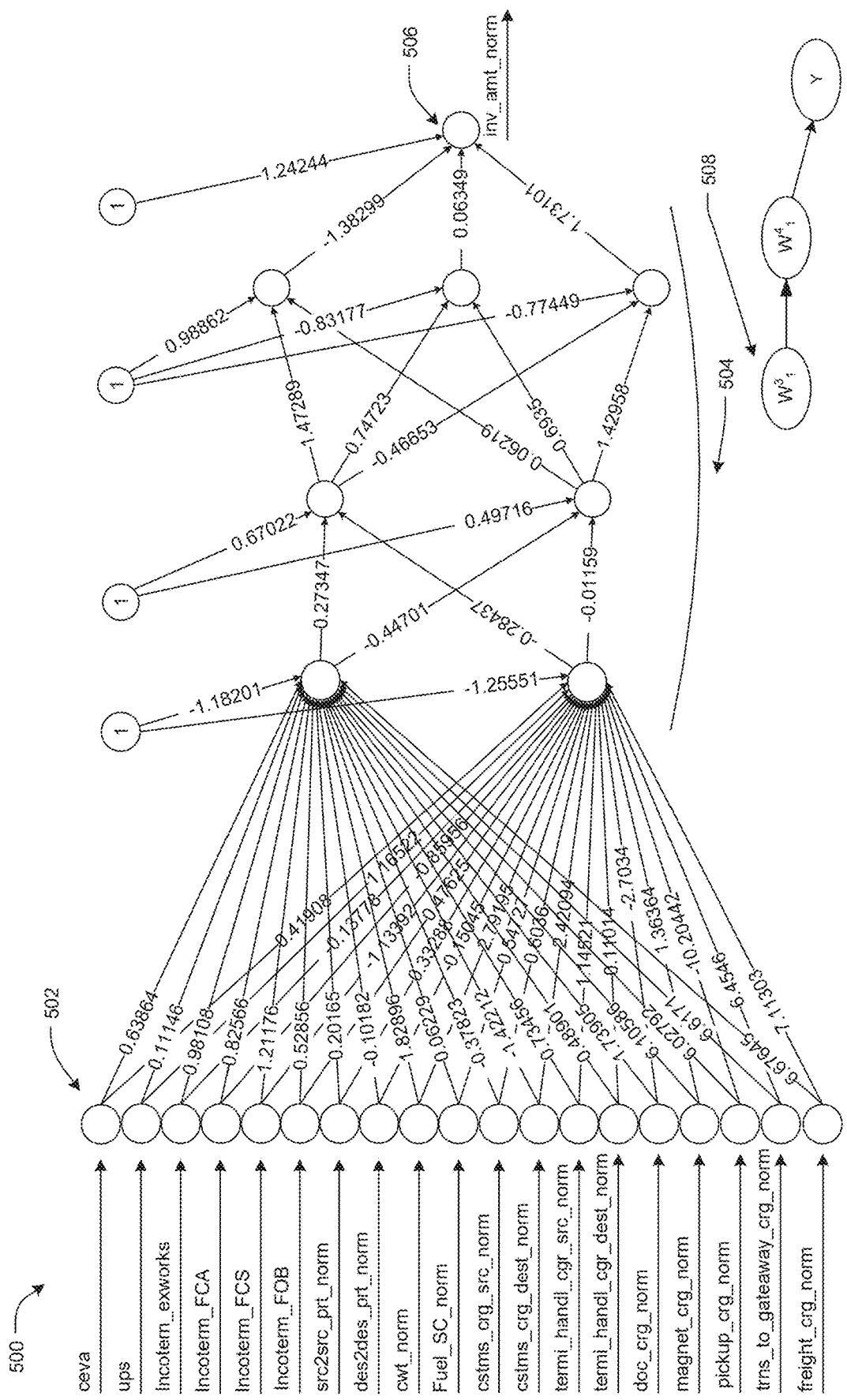
FIG. 5 illustrates an example representation for determination of weights and biases for implementing a proposed system, in accordance with embodiments of the present disclosure.

FIG. 5 illustrates an example representation 500 for determination of weights and biases for implementing a proposed system, in accordance with embodiments of the present disclosure.

In particular, FIG. 5 shows a diagram of a neural network 500 that may be included in the ANN model, in accordance with embodiments of the present disclosure. It may be appreciated that the details of the neural network 500 are discussed herein by way of illustration and that other neural networks may be employed for cost estimations in accordance with other examples. The neural network 500 may include one input layer 502, three hidden layers 504, and one output layer 506. The first layer and the second layer of the three hidden layers 504 may include two nodes each. The third layer may include three nodes. The number of hidden layers can be determined by $2\sqrt{n}$ (where n=>number of covariates/independent variables). For 19 covariates, recommended layers are ≈4. However, upon further optimization, the neural network 500 may perform better at 3 hidden layers. The cost function for the neural network 500 is:

∂C/∂w or ∂C/∂b

C=>Cost Function with respect to any weight w or any bias b where, $$C = C = \frac{1}{2n}\sum_{x}\|y - a^{L}(x)\|^2$$

(the sum is over individual training examples),
n=>total number of training examples,
y=>desired output=>f(x),
L=>number of layers in the network, and
$a^L(x)=a^L=>$vector of activations output from the network when x is input.
$a^L$ is in vectored form and therefore considers each input variable $x_i$
for example, c (1, 0, 0, 0, 0.33, 0, 1, 0.45) [here each element of the vector presents a value of $x_i$]

The neural network 500 was initialized by a random distribution of weights and biases which may be further optimized as detailed below wherein:

$\omega_{jk}^{l}$=>Weight (for the connection) from the $k^{th}$ neuron in $(l-1)^{th}$ layer as indicated at 508 to $j^{th}$ neuron in $l^{th}$ layer $$a_j^l = \sigma\left(\sum_{k}\omega_{jk}^l a_k^{l-1} + b_j^l\right) => \text{activation of } j^{th} \text{ neuron in } l^{th} \text{ layer}$$

Where, $$z_j^l = \sum_{k}\omega_{jk}^l a_k^{l-1} + b_j^l => \text{weighted input to a neuron}$$

$\omega_{jk}^l$ was tweaked till the below equation was satisfied $$\delta_j^l = \frac{\partial C}{\partial z_j^l} =>\text{Partial derivative of error function}$$

Where $\Delta z_j^l$ represents error at each node.
This process was continued for each node to the node connection. Once convergence was achieved for all the y values, the 'y' value curve was smoothened by the equation:

$$\tanh(y) = \frac{e^{2x} - 1}{e^{2x} + 1}$$

The convergence of weights and biases may be given as: Input Layer→Hidden Layer 1→Hidden Layer 2→Hidden Layer 3→Output Layer. In an example embodiment, this may be achieved by the formula given by:

= inv_amt_norm ~ ceva + ups + Incoterm_exworks + Incoterm_FCA + Incoterm_FCS +

Incoterm_FOB + src2src_prt_norm + des2des_prt_norm + cwt_norm +

Fuel_SC_norm + cstms_crg_src_norm + cstms_crg_dest_norm + termi_handl_cgr_src_norm + termi_handl_cgr_dest_norm + doc_crg_norm + magnet_crg_norm + pickup_crg_norm + trns_to_gateaway_crg_norm + freight_crg_norm where, inv_amt_norm=>Normalized form of invoice amount.

Figure 6:
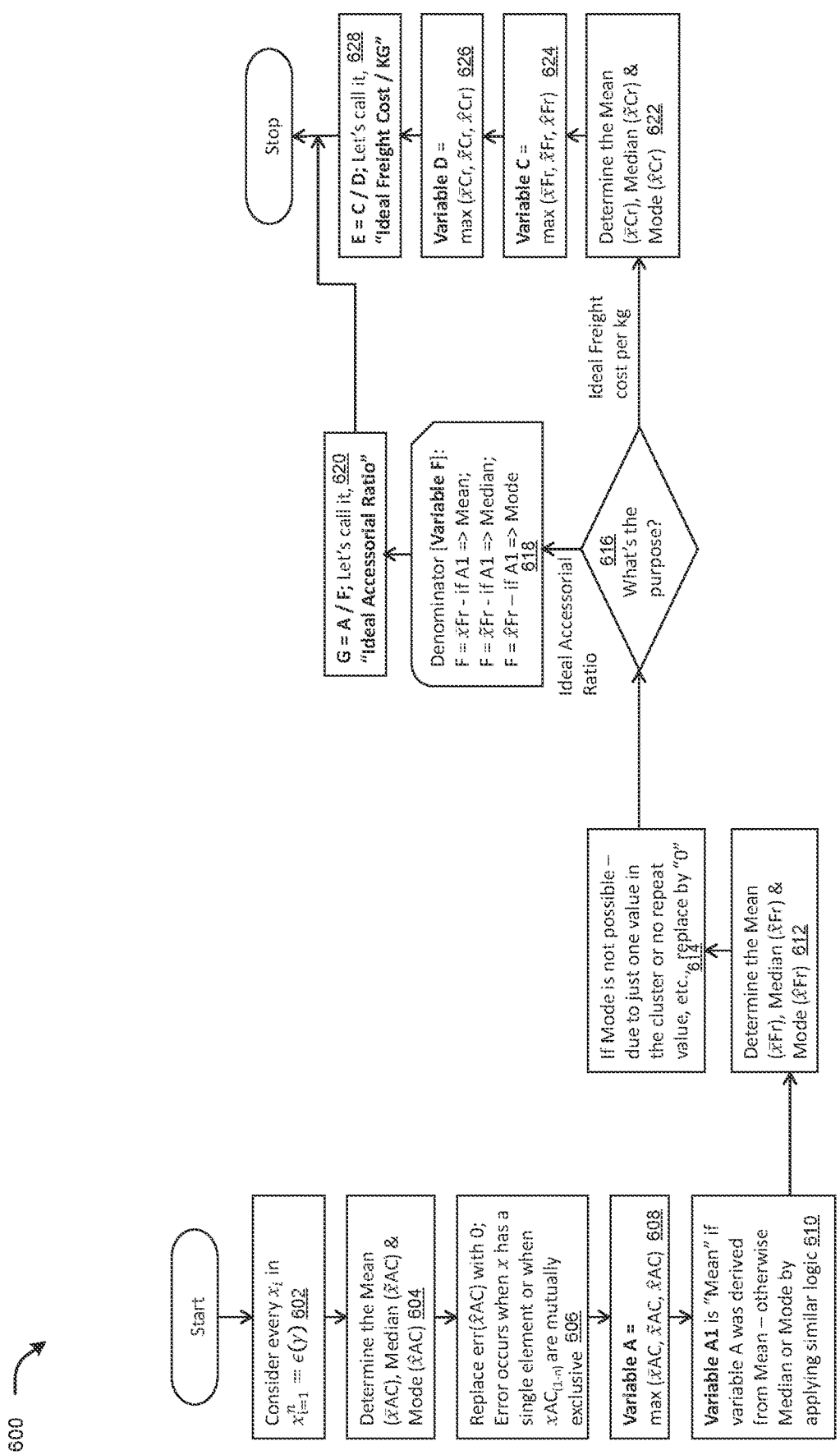
FIG. 6 illustrates an example flow diagram of a method for determining an ideal freight cost and an ideal accessorial ratio, in accordance with embodiments of the present disclosure.

FIG. 6 illustrates an example flow diagram of a method 600 for determining an ideal freight cost and an ideal accessorial ratio, in accordance with embodiments of the present disclosure.

At step 602, the system 108 may consider every cluster object in a cluster training set (for example, clusters of carrier, pickup month, and port to port distance). In an example embodiment, the system 108 may form clusters from the raw data, i.e. historical transaction data. For each cluster object, the system 108 may perform the steps of the method 600 to determine the ideal freight cost and the ideal accessorial ratio to be stored at a knowledge base repository (for example, the knowledge base repository 210 of FIG. 2 or the one depicted in FIG. 4).

At step 604, the system 108 may perform statistical analysis of an accessorial charge mentioned in the historical transactional data. In an example embodiment, the system 108 may determine a mean, a median, and a mode for the accessorial charge for every object in the cluster. In an example embodiment, the accessorial charge may include, but not be limited to, fuel surcharge.

At step 606, the system 108 may replace the error in the mode with 0. An error may occur when the cluster has a single element or when accessorial charge for all objects in the cluster are mutually exclusive.

At step 608, the system 108 may determine a variable A. The variable A may be a maximum of the mean, median, and mode of the accessorial charge.

At step 610, the system 108 may determine a variable A1. The variable A1 may correspond to the mean if the variable A at step 608 was determined to be the mean. In another example embodiment, the variable A1 may be median or mode, based on the variable A determined at step 608.

Further, at step 612, the system 108 may determine a mean, a median, and a mode for freight cost for every object in the cluster. At step 614, the system 108 may replace the error in the mode with 0. It may be appreciated that the step 614 is similar to step 606.

At step 616, the system 108 may determine whether an ideal freight cost needs to be estimated or an ideal accessorial ratio needs to be estimated. In case the ideal freight cost needs to be estimated, the method 600 may proceed to step 622. Else, the method 600 may proceed to step 618.

Referring to FIG. 6, at step 622, the system 108 may determine a mean, a median, and a mode for chargeable weight for every object in the cluster.

Further, at step 624, the system 108 may determine a variable C. The variable C may correspond to a maximum of the mean, median, and mode of the freight charge determined at step 612. Similarly, at step 626, the system 108 may determine a variable D. The variable D may correspond to a maximum of the mean, median, and mode of the chargeable weight determined at step 622. At step 628, the system 108 may determine a variable E. The variable E may correspond to the ideal freight cost per kilogram. In an example embodiment, the ideal freight cost per kilogram may be determined based on a ratio of the variable C and the variable D.

Referring to FIG. 6, at step 618, the system 108 may determine a variable F. The variable F may depend on the variable A1 determined at step 610. For example, if the variable A1 corresponds to the mean of accessorial charge, then the variable F may correspond to the mean of the freight charge determined at step 612. Similarly, if the variable A1 corresponds to the median of accessorial charge, then the variable F may correspond to the median of the freight charge. Likewise, if the variable A1 corresponds to the mode of accessorial charge, then the variable F may correspond to the mode of the freight charge.

Further, at step 620, the system 108 may determine a variable G. The variable G may correspond to the ideal accessorial charge. In an example embodiment, the variable G may be determined based on a ratio of the variable A and the variable F.

Therefore, based on performing the steps of the method 600, the system 108 may build the knowledge base repository including an ideal freight cost and an ideal accessorial cost for each set of variables identified in the training set, i.e. historical transaction data of audited freight invoiced.

It will be appreciated that the steps shown in FIG. 6 are merely illustrative. Other suitable steps may be used to implement the system, if desired. Moreover, the steps of the flow diagram 600 may be performed in any order and may include additional steps.

FIG. 7 illustrates an example representation 700 of an inventory of knowledge base(s), in accordance with embodiments of the present disclosure. In an example embodiment, the example representation 700 may correspond to the knowledge base repository 210 of FIG. 2.

In particular, the inventory 700 includes details of attributes or variables that are processed for the estimation of costs associated with freight invoices, purchase orders, and sales orders. For example, the inventory 700 may include one or more knowledge bases 704 assigned with a unique knowledge base identifier 702. Further, the inventory 700 depicts a description 706 of each knowledge base 704 and a method 708 used for categorizing the variables in each knowledge base 704. In an example embodiment, the knowledge base from 6 to 11 may be referred as non-obvious variables in the present disclosure.

It may be appreciated that the example representation 700, in no way, limits the scope of the knowledge base repository, and other like knowledge bases may exist within the scope of the present disclosure.

FIG. 8 illustrates an example representation 800 of a list of variables used by a proposed system, in accordance with embodiments of the present disclosure.

Referring to FIG. 8, the proposed system 108 may use the list of variables for prediction and estimation. For example, for each data source 802, the list may include a variable name 804 and a data type 806. In an example embodiment, the data source(s) 802 may include airway bills (AWB), external resources, purchase orders or sales orders, freight invoices, contracts, or the like. Further, the data type 806 may include categorical variables or numerical variables.

Example Classification of Shipments

As an example, but not limited to, shipments may be classified on the basis of nature of risks and/or difficulties involved in transportation, into three categories: Hazardous, Oversized, and Normal goods. This classification may be necessary because transportation cost is a function of the nature of goods included in the consignment. Such classifications are readily available in AWBs and/or freight invoice. However, the terminologies may be non-standard, and there may be multiple categories. This process, therefore, in a way also helps in dimensionality reduction. There may be some information/accuracy loss, since dimensionality reduction is involved, but that may be compensated for by tweaking the hyper parameters of the neural network.

Example Classification of Receiver Risk

Behavior of the receiver plays an important role in overall freight cost—especially the Last Mile Delivery cost. One of the numerical indicators of this is an accessorial charge, referred as the "Drop Delivery Charge." This accessorial charge comes into effect when:

1. The receiver refuses the receives the consignment
2. Delays delivery
3. Requires additional service during delivery (like, in room delivery)

Ideally, each receiver should be treated as a distinct variable in the test and training set. Therefore, with the intention to supply a sense of receiver behavior (with least amount of lost accuracy) and in a manner which will allow convergence, to the ANN model, customers may be classified into No Risk, Low Risk, Medium Risk, and High Risk. This may be achieved by:

Receiver master data file preparation-Availability of standardized receiver identities is ideal. In its absence, all the receivers in the database are listed out and opportunities are identified to standardize/consolidate the receiver names. This may be done by identifying the common words in multiple vendors, common addresses for multiple vendors, etc. For example, in the below table, same supplier but with multiple entries in the system/invoice has been standardized.

| Receiver Name (Invoice) | Receiver Name (Standardized) |
|---|---|
| 6045 | 6045 ROERMOND GH |
| 6045 GH | 6045 ROERMOND GH |
| 6045 GH ROERMOND | 6045 ROERMOND GH |
| 6045 ROERMOND | 6045 ROERMOND GH |
| 6045 ROERMOND GH | 6045RMOND GH |

Further, for each receiver, the percentage distribution of drop delivery charges to total overall charge may be calculated. For same receiver with multiple entries, the percentage distribution of drop delivery charges may be calculated at aggregated level.

Once the percentage distribution is calculated, then it may be classified based on quartile method. In this, the entire list of receivers may be classified into 4 sections. Receivers with % drop delivery charges:

0%, are classified as a "No Risk" customer (Q1)
>0% to ≤2%, are "Low Risk" (Q2)
>2% to ≤5%, are classified as "Medium Risk" (Q3) above
>5% are High Risk The summary of receiver risk classification is shown in the below table.

| Quartiles | % Drop Del Charges | Receiver Risk Classification |
|---|---|---|
| Q1 | 0% | No Risk |
| Q2 | >0% to ≤2% | Low Risk |
| Q3 | >2% to ≤5% | Medium Risk |
| Q4 | >5% | High Risk |

Example Classification of Route

Route may be defined as the path which a shipment follows from the origin to destination. So, the origin to destination combination comprises one route. Route is a very important variable in the transportation as each route has huge implications in the freight cost. Ideally, each route may be treated as a distinct variable in the test and training set. Therefore, with the intention to supply a sense of cost involved in each route (with least amount of lost accuracy) and in a manner which will allow convergence, to the ANN model, customers may be classified into Very High, High, Average, Low, and Very Low. This may be achieved by:

Parameters/fields that may need to be considered for route classification, for the route:

Total freight charge, and
Total chargeable weight (kg)

The total freight charge and total chargeable weight may be calculated for each route i.e., unique origin port to destination port combination. Further, average cost per kg may be computed based on a ratio of total freight charge and total chargeable weight. Furthermore, the average cost per kg values may be ranked in a descending order and then classified by percentile (k %*total number of routes, here k=5).

For example, the $20^{th}$ percentile of the dataset may be calculated by, 0.2*total number of routes. So, this value may give the rank or the cut-off level till where the dataset can be classified in $20^{th}$ percentile starting from the top.

The summary of classification of routes based on this percentile ranking is shown in the below table.

| Percentile | Rank | Route Class |
|---|---|---|
| 20th | 22 | Very High |
| 40th | 43 | High |
| 60th | 65 | Average |
| 80th | 86 | Low |
| 100th | >86 | Very Low |

It may be appreciated that the above examples and example representation 800, in no way, limits the scope of the variables, and other like variables may exist within the scope of the present disclosure.

Figure 9:
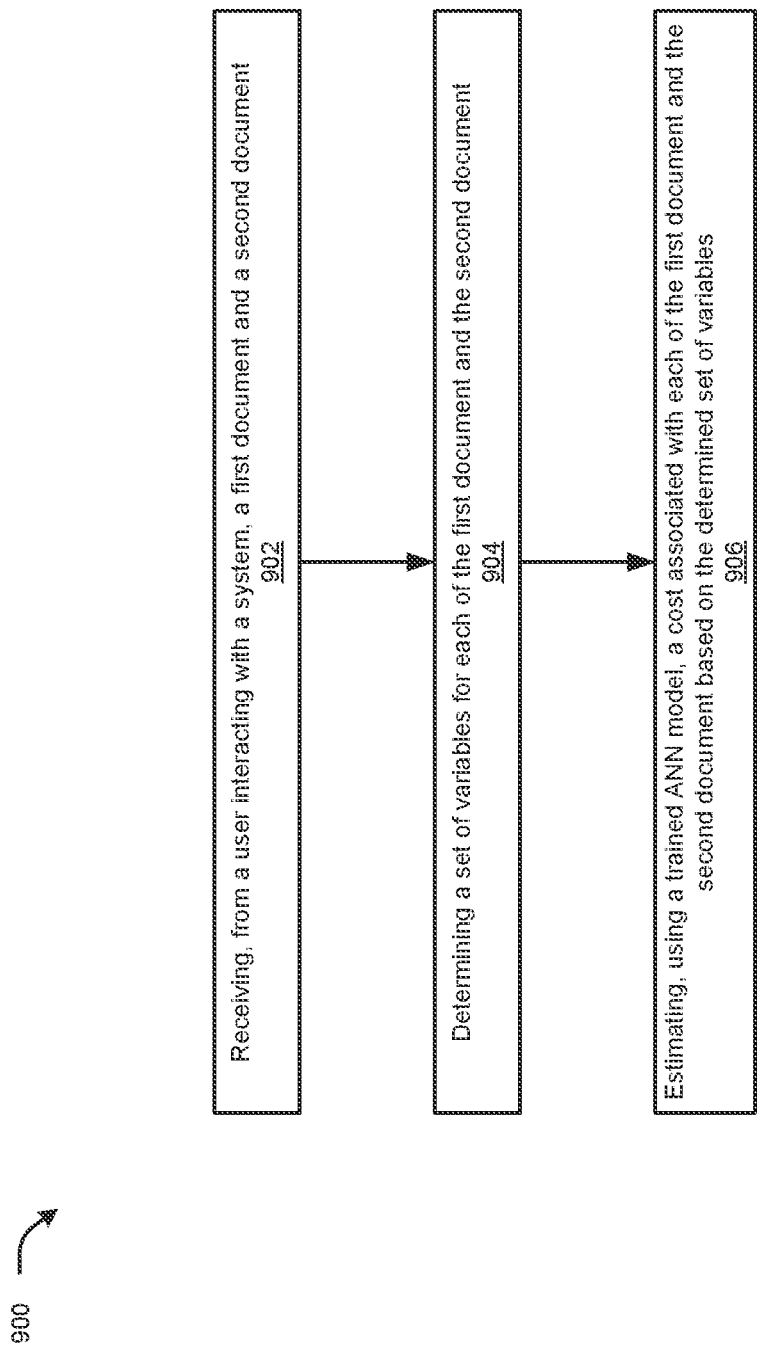
FIG. 9 illustrates an example flow diagram of a method for estimating cost(s) associated with document(s), in accordance with embodiments of the present disclosure.

FIG. 9 illustrates an example flow diagram of a method 900 for estimating cost(s) associated with document(s), in accordance with embodiments of the present disclosure. It may be appreciated that the steps of the method 900 may be performed by the proposed freight invoice estimation advisor or the system 108.

At step 902, the method 900 may include receiving, from a user (for example, the user 102) interacting with the system 108, a first document and a second document. In an example embodiment, the user 102 may send a request to the system 108 for estimating cost(s) associated with the first document and/or the second document. In an example embodiment, an actual value may be associated with the second document (i.e. already paid freight invoice).

At step 904, the method 900 may include determining a set of variables for each of the first document and the second document. In an example embodiment, the set of variables may be determined based on a statistical analysis of historical data such as audited freight invoices. In an example embodiment, the set of variables may include a first set of variables (i.e. obvious variables) and a second set of variables (i.e. non-obvious variables). In an example embodiment, the first set of variables and the second set of variables may be further segregated into categorical variables and numerical variables. In an example embodiment, the method 900 may include processing the set of variables based on applying an encoding technique on the categorical variables and normalizing the numeric variables. Further, the method 900 may include enriching the processed set of variables based on a knowledge base repository, and training an artificial neural network model based on the enriched set of variables.

Referring to FIG. 9, at step 906, the method 900 may include estimating, using a trained ANN model, a cost associated with each of the first document and the second document. In an example embodiment, the estimation may be based on the determined set of variables. The cost associated with the first document may be an estimated freight cost for the first document. The cost associated with the second document may be an estimated true value for the second document.

Therefore, the present disclosure facilitates creation of variables that may not be obvious from purchase or sales orders and freight invoices. Further, the present disclosure facilitates the creation of pseudo invoices from purchase orders or sales orders based on the creation of variables. Furthermore, the present disclosure provides an ANN model capable of a subject matter expert like judgement in order to estimate freight cost(s) for both purchase orders and sales orders as well as freight invoices.

A person of ordinary skill in the art will readily ascertain that the illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 10:
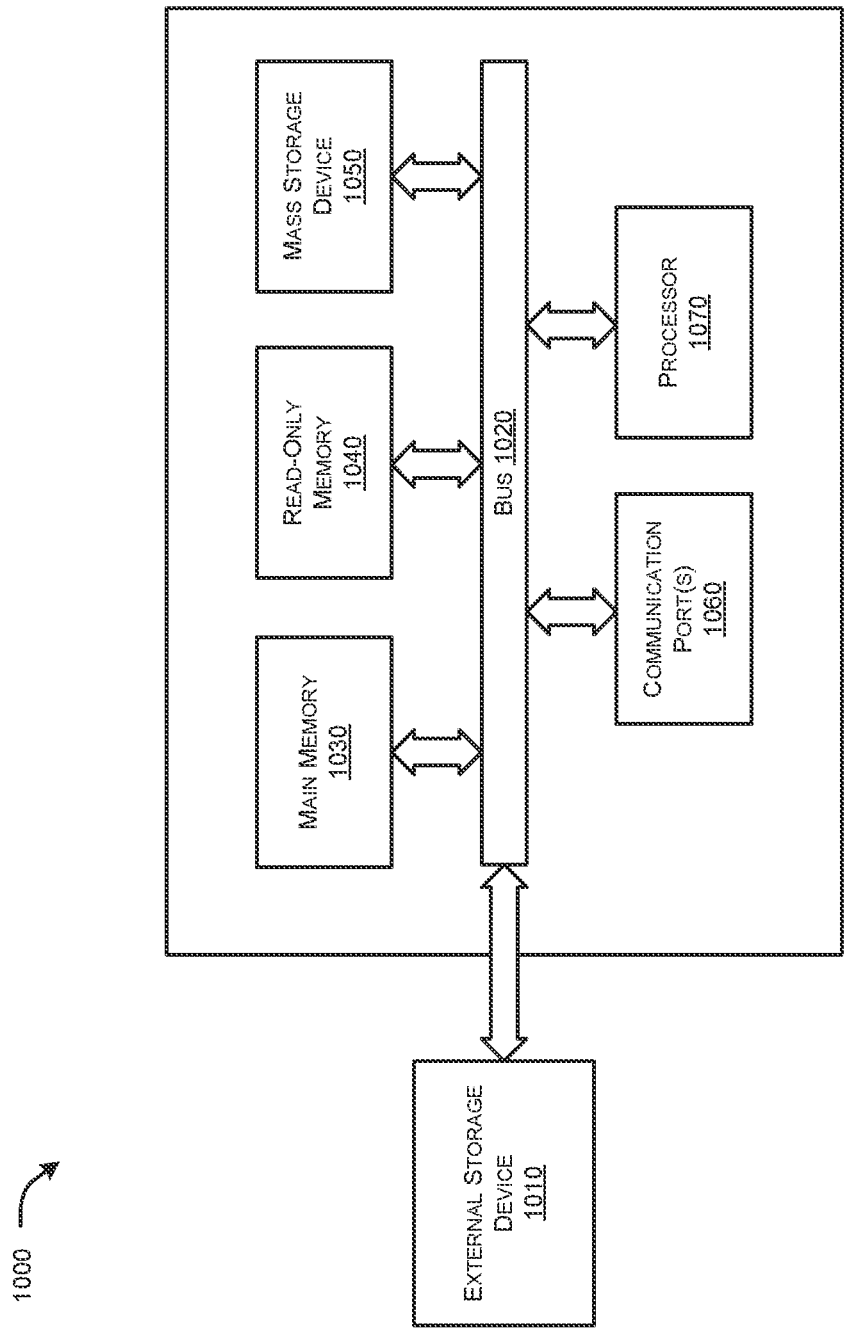
FIG. 10 illustrates a computer system in which or with which embodiments of the present disclosure may be implemented.

FIG. 10 illustrates a computer system 1000 in which or with which embodiments of the present disclosure may be implemented. In particular, the disclosed system 108, i.e. the freight invoice estimation advisor may be implemented as the computer system 1000.

Referring to FIG. 10, the computer system 1000 may include an external storage device 1010, a bus 1020, a main memory 1030, a read-only memory 1040, a mass storage device 1050, communication port(s) 1060, and a processor 1070. A person skilled in the art will appreciate that the computer system 1000 may include more than one processor and communication ports. The communication port(s) 1060 may be any of an RS-232 port for use with a modem-based dialup connection, a 10/100 Ethernet port, a Gigabit or 10 Gigabit port using copper or fiber, a serial port, a parallel port, or other existing or future ports. The communication port(s) 1060 may be chosen depending on a network, such a Local Area Network (LAN), Wide Area Network (WAN), or any network to which the computer system 1000 connects. The main memory 1030 may be random access memory (RAM), or any other dynamic storage device commonly known in the art. The read-only memory 1040 may be any static storage device(s) including, but not limited to, a Programmable Read Only Memory (PROM) chips for storing static information e.g., start-up or basic input/output system (BIOS) instructions for the processor 1070. The mass storage device 1050 may be any current or future mass storage solution, which may be used to store information and/or instructions. The bus 1020 communicatively couples the processor 1070 with the other memory, storage, and communication blocks. The bus 1020 can be, e.g. a Peripheral Component Interconnect (PCI)/PCI Extended (PCI-X) bus, Small Computer System Interface (SCSI), universal serial bus (USB), or the like, for connecting expansion cards, drives, and other subsystems as well as other buses, such a front side bus (FSB), which connects the processor 1070 to the computer system 1000. Optionally, operator and administrative interfaces, e.g. a display, keyboard, and a cursor control device, may also be coupled to the bus 1020 to support direct operator interaction with the computer system 1000. Other operator and administrative interfaces may be provided through network connections connected through the communication port(s) 1060. In no way should the aforementioned exemplary computer system limit the scope of the present disclosure.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

The invention claimed is:

1. A system, comprising:
a processor; and
a memory coupled to the processor, wherein the memory comprises processor-executable instructions, which on execution, cause the processor to:
receive, from a user interacting with the system, a first document and a second document, wherein an actual value is associated with the second document;

determine a set of variables for each of the first document and the second document, wherein the set of variables are determined based on a statistical analysis of historical data;

segregate the set of variables into a first set of variables corresponding to a categorical variables and a second set of variables corresponding to numerical variables, wherein the categorical variables are converted into binary codes using an encoding technique, and wherein the numerical variables are normalized using a normalization technique;

train, using a transformation module, an artificial neural network (ANN) model by performing linear transformation on the numerical variables, wherein the ANN model references a deep learning method including algorithms based on brain function, wherein the ANN model provides a relationship between inputs and outputs to discover a new pattern of the set of variables;

estimate, using the trained ANN model, a cost associated with each of the first document and the second document based on the segregated set of variables, wherein the cost associated with the first document comprises an estimated freight cost for the first document, and wherein the cost associated with the second document comprises an estimated true value for the second document; and provide the estimated cost associated with the first document and the second document associated with the second document to the user, via a user interface, interacting with the system.

2. The system of claim 1, wherein the memory comprises processor-executable instructions, which on execution, cause the processor to convert the first document into a pseudo document.

3. The system of claim 2, wherein the memory comprises processor-executable instructions, which on execution, cause the processor to convert the first document into the pseudo document by:
  estimating a set of parameters for the first document based on the set of variables;
  assigning the set of parameters to the first document based on a knowledge base; and
  converting the first document into the pseudo document based on the assigned set of parameters.

4. The system of claim 3, wherein the set of parameters comprise at least one of:
  an accessorial cost and a freight cost.

5. The system of claim 1, wherein the memory comprises processor-executable instructions, which on execution, cause the processor to:
  validate the estimated true value for the second document with the actual value associated with the second document;
  in response to a positive validation, dynamically enrich a knowledge base based on the second document; and
  in response to a negative validation, flag the second document for audit.

6. The system of claim 1, wherein the memory comprises processor-executable instructions, which on execution, cause the processor to determine the set of variables by extracting the second set of variables based on the statistical analysis of the historical data, and wherein the historical data comprises at least data from audited second documents.

7. The system of claim 1, wherein the second set of variables comprise at least one of: classified type of shipment, classified port to port cost, risk associated with a shipper, risk associated with a receiver, and a risk associated with a carrier.

8. The system of claim 1, wherein the first set of variables comprise at least one of: a unique key of the first document, a source port, a destination port, a selected carrier, a customer name, and a chargeable weight.

9. The system of claim 1, wherein the memory comprises processor-executable instructions, which on execution, cause the processor to determine the set of variables by:
  processing the set of variables based on applying the encoding technique on the categorical variables and normalizing the numeric variables;
  enriching the processed set of variables based on the knowledge database; and
  training the ANN model based on the enriched set of variables.

10. The system of claim 9, wherein the knowledge base comprises at least one of an ideal accessorial cost and an ideal freight cost corresponding to each of the set of variables.

11. A method, comprising:
  receiving, by a processor in a system, from a user interacting with the system, a first document and a second document, wherein an actual value is associated with the second document;
  determining, by the processor, a set of variables for each of the first document and the second document, wherein the determining is based on a statistical analysis of historical data;
  segregating the set of variables into a first set of variables corresponding to a categorical variables and a second set of variables corresponding to numerical variables, wherein the categorical variables are converted into binary codes using an encoding technique, and wherein the numerical variables are normalized using a normalization technique;
  training, using a transformation module, an artificial neural network (ANN) model by performing linear transformation on the numerical variables, wherein the ANN model references a deep learning method including algorithms based on brain function, wherein the ANN model provides a relationship between inputs and outputs to discover a new pattern of the set of variables;
  estimating, by the processor, using a trained ANN model, a cost associated with each of the first document and the second document based on the segregated set of variables, wherein the cost associated with the first document comprises an estimated freight cost for the first document, and wherein the cost associated with the second document comprises an estimated true value for the second document; and
  providing the estimated cost associated with the first document and the second document associated with the second document to the user, via a user interface, interacting with the system.

12. The method of claim 11, comprising converting, by the processor, the first document into a pseudo document by:
  estimating, by the processor, a set of parameters for the first document based on the set of variables;
  assigning, by the processor, the set of parameters to the first document based on a knowledge base; and
  converting, by the processor, the first document into the pseudo document based on the assigned set of parameters.

13. The method of claim 11, comprising extracting, by the processor, the second set of variables based on the statistical analysis of the historical data, wherein the historical data comprises at least data from audited second documents.

14. The method of claim 11, wherein the determining, by the processor, the set of variables comprises:
processing, by the processor, the set of variables based on applying the encoding technique on the categorical variables and normalizing the numeric variables;
enriching, by the processor, the processed set of variables based on the knowledge database; and
training, by the processor, the ANN model based on the enriched set of variables.

15. The method of claim 14, wherein the knowledge base comprises at least one of an ideal accessorial cost and an ideal freight cost corresponding to each of the set of variables.

16. The method of claim 11, comprising:
validating, by the processor, the estimated true value for the second document with the actual value associated with the second document;
in response to a positive validation, dynamically enriching, by the processor, a knowledge base based on the second document; and
in response to a negative validation, flagging, by the processor, the second document for audit.

17. The method of claim 11, wherein the second set of variables comprise at least one of: classified type of shipment, classified port to port cost, risk associated with a shipper, risk associated with a receiver, and a risk associated with a carrier.

18. A non-transitory computer-readable medium comprising machine-readable instructions that are executable by a processor to:
receive, from a user interacting with the system, a first document and a second document;
determine a set of variables for each of the first document and the second document, wherein the set of variables are determined based on a statistical analysis of historical data;
segregate the set of variables into a first set of variables corresponding to a categorical variables and a second set of variables corresponding to numerical variables, wherein the categorical variables are converted into binary codes using an encoding technique, and wherein the numerical variables are normalized using a normalization technique;
training, using a transformation module, an artificial neural network (ANN) model by performing linear transformation on the numerical variables, wherein the ANN model references a deep learning method including algorithms based on brain function, wherein the ANN model provides a relationship between inputs and outputs to discover a new pattern of the set of variables;
estimate, using a trained ANN model, a cost associated with each of the first document and the second document based on the segregated set of variables, wherein the cost associated with the first document comprises an estimated freight cost for the first document, and wherein the cost associated with the second document comprises an estimated true value for the second document; and
provide the estimated cost associated with the first document and the second document associated with the second document to the user, via a user interface, interacting with the system.

* * * * *